US007684801B2

(12) United States Patent
Suzuki et al.

(10) Patent No.: US 7,684,801 B2
(45) Date of Patent: Mar. 23, 2010

(54) CONTROL DEVICE, HANDOVER CONTROL METHOD AND MOBILE COMMUNICATION SYSTEM

(75) Inventors: Toshihiro Suzuki, Kawasaki (JP); Hiroshi Kawakami, Yokosuka (JP); Akihito Okura, Yokohama (JP); Masami Yabusaki, Kashiwa (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 11/858,677

(22) Filed: Sep. 20, 2007

(65) Prior Publication Data

US 2008/0051089 A1    Feb. 28, 2008

Related U.S. Application Data

(63) Continuation of application No. 10/690,524, filed on Oct. 23, 2003, now abandoned.

(30) Foreign Application Priority Data

Oct. 28, 2002    (JP)    ............................ 2002-313092

(51) Int. Cl.
*H04W 36/00*    (2009.01)
*H04W 4/00*    (2009.01)
(52) U.S. Cl. ...................... 455/436; 370/331
(58) Field of Classification Search ............. 370/331; 455/436, 561
See application file for complete search history.

(56) References Cited

U.S. PATENT DOCUMENTS 6,381,458 B1    4/2002    Frodigh et al.

(Continued)

FOREIGN PATENT DOCUMENTS

EP    0 602 340 A1    6/1994

(Continued)

OTHER PUBLICATIONS

B. Black, et al., http://www.ietf.org/internet-drafts/draft-ietf-multi6-multihoming-requirements-02-candidate 1.txt, pp. 1-9, "Requirements for IPV6 Site-Multihoming Architectures", Nov. 2001.

(Continued)

*Primary Examiner*—George Eng
*Assistant Examiner*—Michael Faragalla
(74) *Attorney, Agent, or Firm*—Oblon, Spivak, McClelland, Maier & Neustadt, L.L.P.

(57) ABSTRACT

An object of the present invention is to avoid packet loss and implement a seamless handover by minimizing the handover latency when a handover is implemented by a multihomed moving network (MN) or a mobile host (MH). The present invention is a mobile communication system that is constituted comprising an MN, a plurality of AI each constituting an interface for the connection to a core network at the MN, and a control device (MMF), wherein the MMF dynamically changes the AI adopted as the connection interface when a predetermined condition is satisfied on the basis of the connection status to the core network at each AI or the prediction information for a subsequent handover. In so doing, the control device continues the transmission and receipt of data with respect to an appropriate AI capable of maintaining a predetermined communication quality, and maintains the connection to the core network of another AI while causing this AI to enter a closed state in which the transmission and receipt of data is disabled.

12 Claims, 14 Drawing Sheets

U.S. PATENT DOCUMENTS

| | | | |
|---|---|---|---|
| 6,553,231 B1 * | 4/2003 | Karlsson et al. | 455/436 |
| 6,985,731 B1 * | 1/2006 | Johnson et al. | 455/436 |
| 7,013,149 B2 * | 3/2006 | Vetro et al. | 455/456.1 |
| 7,020,108 B2 * | 3/2006 | Virtanen | 370/331 |
| 2004/0253984 A1 * | 12/2004 | Csapo et al. | 455/561 |

FOREIGN PATENT DOCUMENTS

| | | | |
|---|---|---|---|
| JP | 10-164640 | | 6/1998 |
| WO | WO 01/35585 | * | 5/1998 |
| WO | WO 00/11901 | | 3/2000 |
| WO | WO 01/35585 A1 | | 5/2001 |

OTHER PUBLICATIONS

Markus Uhlirz, "Concept of a GSM-based Communication System for High-Speed Trains", Vehicular Technology Conference, 1994 IEEE, XP010123252, Jun. 8, 1994, pp. 1130-1134.

* cited by examiner

CONTROL DEVICE, HANDOVER CONTROL METHOD AND MOBILE COMMUNICATION SYSTEM

CROSS-REFERENCE TO RELATED APPLICATIONS

This application is a continuation of and is based upon and claims the benefit of priority under 35 U.S.C. §120 for U.S. Ser. No. 10/690,524, filed Oct. 23, 2003 now abandoned, and claims the benefit of priority under 35 U.S.C. §119 from Japanese Patent Application No. 2002-313092, filed Oct. 28, 2002, the entire contents of each which are incorporated herein by reference.

BACKGROUND OF THE INVENTION

1. Field of the Invention

The present invention relates to control device, handover control method and mobile communication system, and more particularly, to handover control method by a mobile communication system constituted comprising a mobile host, or a moving network comprising a plurality of mobile hosts; a plurality of mutually connectable access interfaces each constituting an interface for the connection to a core network at the mobile host or moving network; and a control device for controlling a handover relating to the connection to the core network at the access interfaces, as well as to the mobile communication system and a control device that constitutes the mobile communication system.

2. Related Background Art

The technology relating to a conventional multihoming moving network and host mainly involves addressing, routing, and so forth. More specifically, a routing protocol according to which it is verified whether or not a plurality of addresses have been assigned according to multihoming, and, if a plurality of addresses have been assigned, even when a certain interface is disconnected, the data destined for the address assigned to the interface can be transmitted to the mobile host and network, has been proposed. In addition, the principal object of multihoming is load sharing and fault tolerant (for example, "Requirements for IPv6 Site-Multihoming Architectures" (see http://www.ietf.org/internet-drafts/draft-ietf-multi6-m ultihoming-requirements-07.txt)).

Further, a mobile host and moving network that are multihomed by means of a plurality of access interfaces exhibit the characteristic that the communication quality of a line connected to each access interface varies according to movement.

However, conventionally, because a variation in the communication quality of a line connected to each access interface has not been predicted, the handover that pertains to the connection to the core network at the access interface, has been performed after one line is disconnected. Such handover is not performed smoothly and a handover latency occurs, resulting in packet loss.

The present invention was conceived in view of resolving the above problems, an object thereof being to provide control device, handover control method, and mobile communication system, which use the merits of multihoming, and make it possible to avoid packet loss and implement a seamless handover by minimizing the handover latency when a handover is implemented by a moving network and host.

SUMMARY OF THE INVENTION

In order to achieve the above object, the control device according to the present invention is a control device, which constitutes a mobile communication system together with a mobile host, or a moving network comprising a plurality of mobile hosts, and a plurality of mutually connectable access interfaces each constituting an interface for the connection to a core network at the mobile host or moving network, and which serves to control a handover relating to the connection to the core network at the access interfaces, comprising: connection status acquiring means for acquiring information on the connection status to the core network at each access interface, from each access interface; handover predicting means for predicting a subsequent handover on the basis of the information on the connection status to the core network at each access interface; and changing means for dynamically changing the access interface adopted as the connection interface in accordance with predetermined logic when a predetermined condition is satisfied on the basis of the information on the connection status to the core network at each access interface or the prediction information for a subsequent handover.

In order to achieve the above object, the handover control method according to the present invention is a handover control method of a mobile communication system that is constituted comprising a mobile host, or a moving network comprising a plurality of mobile hosts; a plurality of mutually connectable access interfaces each constituting an interface for the connection to a core network at the mobile host or moving network; and a control device for controlling a handover relating to the connection to the core network at the access interfaces, wherein the control device dynamically changes the access interface adopted as the connection interface in accordance with predetermined logic when a predetermined condition is satisfied on the basis of the connection status to the core network at each access interface or the prediction information for a subsequent handover.

In order to achieve the above object, the mobile communication system according to the present invention is a mobile communication system that is constituted comprising a mobile host, or a moving network comprising a plurality of mobile hosts; a plurality of mutually connectable access interfaces each constituting an interface for the connection to a core network at the mobile host or moving network; and a control device for controlling a handover relating to the connection to the core network at the access interfaces, wherein the control device comprises: connection status acquiring means for acquiring information on the connection status to the core network at each access interface, from each access interface; handover predicting means for predicting a subsequent handover on the basis of the information on the connection status to the core network at each access interface; and changing means for dynamically changing the access interface adopted as the connection interface in accordance with predetermined logic when a predetermined condition is satisfied on the basis of the information on the connection status to the core network at each access interface or the prediction information for a subsequent handover.

According to these inventions, in the case of a mobile host and network that are multihomed by means of a plurality of access interfaces, attention is drawn to a characteristic according to which the communication quality of the line connected to each access interface varies with movement, or similar. Once the mobile host and network has acquired information on the connection status to the core network at each access interface or predicted a subsequent handover, the access interface adopted as the connection interface is dynamically changed on the basis of this connection status information or subsequent handover prediction information. Thus, when, conventionally, a handover latency is generated without the variation in the communication quality of the line connected to each access interface being predicted, packet loss can be avoided and a seamless handover implemented by minimizing the handover latency by means of the dynamic change to the access interface on the basis of the connection status information or handover prediction information.

Here, it is desirable that, upon dynamically changing the access interface, changing means of the control device should continue the transmission and receipt of data with respect to an appropriate access interface capable of maintaining a predetermined communication quality, and maintain the connection to the core network with respect to an access interface other than the appropriate access interface while causing the access interface to enter a closed state in which the transmission and receipt of data is disabled. In this case, the access interface change processing is switched locally without propagation to the entire network or informing the origin of the transmission as per an ordinary handover procedure, and hence the switching time can be shortened. An access interface other than the appropriate access interface is afforded a closed state in which the transmission and receipt of data is disabled without disconnecting the connection to the core network. Hence, the effects of packet loss and a handover latency as a result of performing the conventional non-local change processing do not come to bear, whereby a seamless handover can be implemented.

Further, here, upon dynamically changing the access interface, changing means of the control device continue the transmission and receipt of data, when a mobile host is connected to the appropriate access interface which is capable of maintaining a predetermined communication quality and when the access interface connected to the mobile host is connected to the appropriate access interface. On the other hand, when the mobile host is not connected to the appropriate access interface and the access interface connected to the mobile host is not connected to the appropriate access interface, changing means of the control device desirably continue communications by establishing a connection between the mobile host and the appropriate access interface or a connection between the access interface connected to the mobile host and the appropriate access interface.

Therefore, not only when the mobile host is connected to an appropriate access interface that is capable of maintaining a predetermined communication quality, but also when the access interface to which the mobile host is connected, is connected to the appropriate access interface, the transmission and receipt of data in which a predetermined communication quality is maintained, can be implemented by continuing the transmission and receipt of data via the appropriate access interface. On the other hand, the transmission and receipt of data in which a predetermined communication quality is maintained, can be implemented by continuing transmission by establishing a connection between the mobile host and the appropriate access interface or a connection between the access interface connected to the mobile host and the appropriate access interface, when the mobile host is not connected to the appropriate access interface and the access interface connected to the mobile host is not connected to the appropriate access interface.

Further, at such time, the control device desirably further comprises downlink control means that perform control so that downlink data from the core network is transmitted via an access router that is connected to the appropriate access interface, among the access routers in the core network. Therefore, the transmission and receipt of data in which a predetermined communication quality is maintained, can be implemented by performing controlling so that downlink data from the core network is also transmitted and received via the appropriate access interface.

By the way, a condition according to which the field strength between the access interface and the core network should be less than a predetermined threshold value can be adopted as the predetermined condition constituting the turning point at which the access interface is changed by the control device.

Further, a condition according to which a predicted value for the field strength between the access interface and the core network which is predicted on the basis of subsequent movement prediction should be less than a predetermined threshold value can also be adopted as the predetermined condition.

Meanwhile, a logic that involves selecting an access interface that corresponds with a maximum-value field strength from among the field strengths between each access interface and the core network can be adopted as the predetermined logic used when the access interface is dynamically changed by the control device.

Further, a logic that involves selecting an access interface that corresponds with a predicted value for the maximum-value field strength from among predicted values for the field strengths between each access interface and the core network, which are predicted on the basis of subsequent movement prediction can be adopted as the above predetermined logic.

By the way, the control device according to the present invention is characterized in that the connection status acquiring means are constituted comprising: locational relationship tracking means for tracking the locational relationship of all the access interfaces connected to the mobile hosts and the moving network; and information receiving means for receiving information on the connection status between each access interface and the core network, and switching information that includes identification information for identifying the previous access router and the destination access router at the time switching occurs, as well as switching end time information, the information being reported by each access interface; and wherein the handover predicting means are constituted comprising: velocity tracking means for tracking at least velocity information pertaining to the mobile hosts and the moving network in accordance with a predetermined tracking logic, on the basis of the locational relationship of each access interface thus tracked and the connection status information and switching information thus received; and predicting means for predicting subsequent movement and changes in the field strength based on the tracked information.

Preferably the handover control method according to the present invention, is characterized in that the control device tracks the locational relationship of all the access interfaces connected to the mobile hosts and the moving network; the control device receives information on the connection status between each access interface and the core network, and switching information that includes identification information for identifying the previous access router and the destination access router at the switching time, as well as switching end time information, this information being reported by each access interface; the control device tracks at least velocity information pertaining to the mobile hosts and moving network in accordance with a predetermined tracking logic; and the control device predicts subsequent movement and changes in the field strength, on the basis of the tracked information.

According to these inventions, at least velocity information pertaining to the mobile host and moving network is tracked in accordance with a predetermined tracking logic, on the basis of the locational relationship of each access interface thus tracked and of the reported information on the connection status between each access interface and the core network, and switching information that includes identification information for identifying the previous access router and the destination access router at the time switching occurs, as well as switching end time information, and subsequent movement and changes in the field strength are predicted based on the tracked information. For this reason, handover prediction information of favorable accuracy can be obtained, and it is possible to implement a seamless handover more reliably.

Here, in the tracking of velocity information, for a mobile host and moving network that are multihomed by means of two access interfaces, upon recognizing, on the basis of the switching information from each access interface, that the adjacent switchings are executed by the same access router, velocity tracking means of the control device desirably tracks a value obtained by dividing the distance x by the switching time difference t, as the velocity pertaining to the mobile host and moving network, based on a switching time difference t and a distance x between the access interfaces for the adjacent switchings. In this case, the velocity of the mobile host and moving network can be tracked with favorable accuracy.

Further, in the tracking of velocity information, for a mobile host and moving network that are multihomed by means of three or more access interfaces, upon recognizing, on the basis of the switching information from each access interface, that the adjacent switchings are executed by the same access router, velocity tracking means of the control device desirably tracks, based on a plurality of combinations of the switching time difference t and the distance x between the access interfaces for the adjacent switchings, a direction which links the two access interfaces and where the first-switched access interface lies foremost as the direction of movement, and a value obtained by dividing the distance x by the switching time difference t as the velocity, with respect to each combination; and finds the vector sum of the velocity vectors for each combination and tracks the direction of movement and velocity of the mobile host and moving network by means of the vector sum thus obtained. In this case, the direction of movement and velocity pertaining to the mobile host and moving network, can be tracked with favorable accuracy.

DESCRIPTION OF THE PREFERRED EMBODIMENTS

Various embodiments according to the present invention will be described hereinbelow. Further, in the embodiment below, because the case of the mobile host is included in substance by the case of a moving network, only the case of the moving network will be illustrated.

First Embodiment

Figure 1:
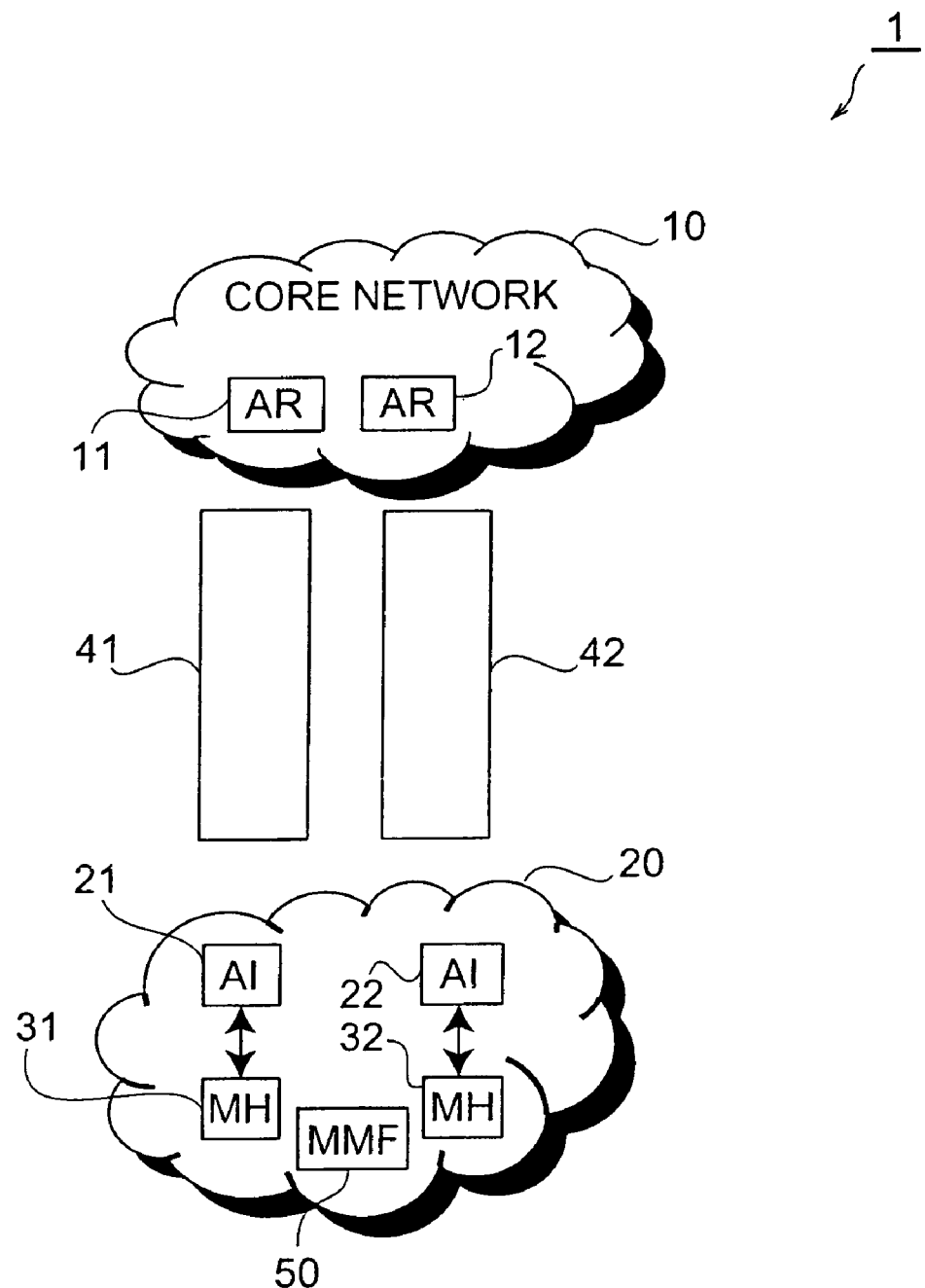
FIG. 1 is a constitutional view of the mobile communication system of the first embodiment.

FIG. 1 is a constitutional view of a mobile communication system of a first embodiment. As shown in this figure, a mobile communication system 1 is constituted by a core network 10, which is constituted comprising a plurality of access routers (referred to as "AR" hereinafter) 11, 12; and a moving network (referred to as "MN" hereinafter) 20, which is constituted comprising a plurality of access interfaces (referred to as "AI" hereinafter) 21, 22, a plurality of mobile hosts (referred to as "MH" hereinafter) 31, 32, and a control device (referred to as "MMF" hereinafter) 50 that is provided with a function for governing mobile management and switching instructions (MMF: Mobility Management Function). The MH 31 is connected to an AR (AR 11 in the example in FIG. 1) on the side of the core network 10 via either line 41 of the AI 21 or line 42 of the AI 22 (line 41 in the example in FIG. 1), and thus transmits and receives data. The same is true of the MH 32.

Further, the MN 20 moves from left to right in FIG. 1. Of the two AI 21, 22, the AI 22 which lies foremost in the direction of movement is called an NAI (New Access Interface), and the AI 21 that lies rearward in the direction of movement is called an OAI (Old Access Interface).

Figure 2:
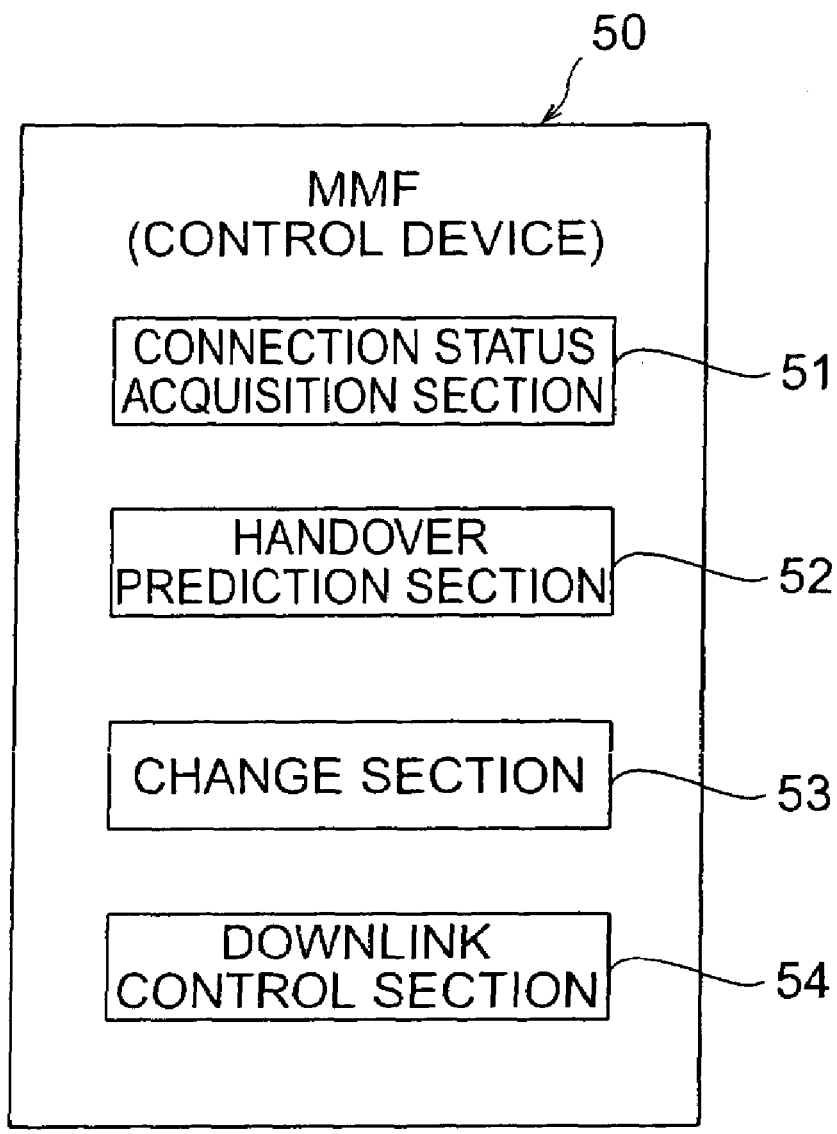
FIG. 2 is a function block constitutional view of the MMF of the first embodiment.

FIG. 2 is a function block constitutional view of the MMF 50 of the first embodiment. As shown in this figure, the MMF 50 is constituted comprising a connection status acquisition section 51, which acquires information from each AI on the connection status of each AI to the core network 10; a handover prediction section 52, which predicts a subsequent handover on the basis of the connection status information for each AI thus acquired; a change section 53 for dynamically changing the AI adopted as the connection interface in accordance with predetermined logic when a predetermined condition is satisfied on the basis of the connection status information for each AI or prediction information on a subsequent handover; and a downlink control unit 54 that performs control so that an MH is allowed to transmit downlink data from the core network 10 via an AR, of the AR 11, 12 on the side of the core network 10, which is connected to an AI (referred to as "FAI" (Fine AI) hereinafter) that is capable of maintaining a predetermined communication quality.

Figure 3A:
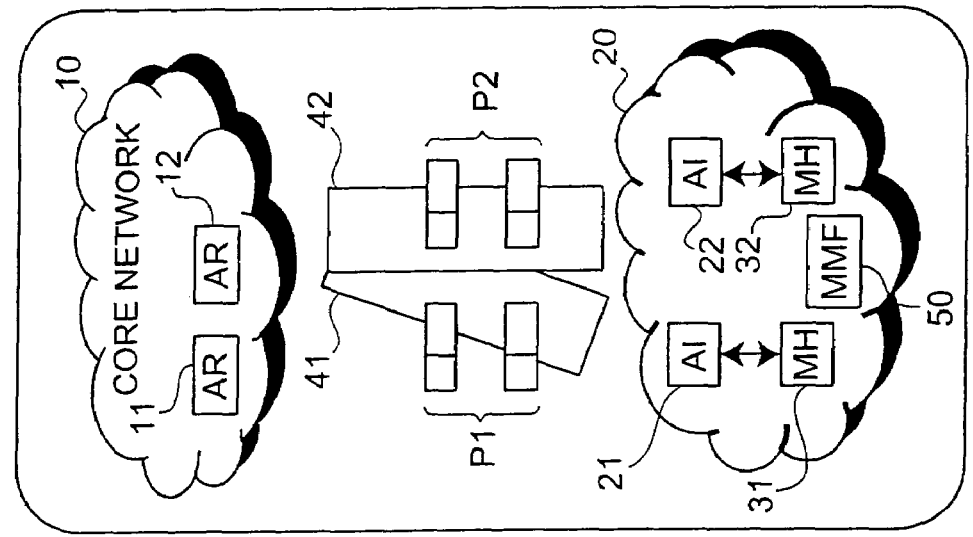
FIG. 3A is a pre-handover state diagram which serves to illustrate the logic of a seamless handover using multihoming, of a multihoming moving network.
Figure 3B:
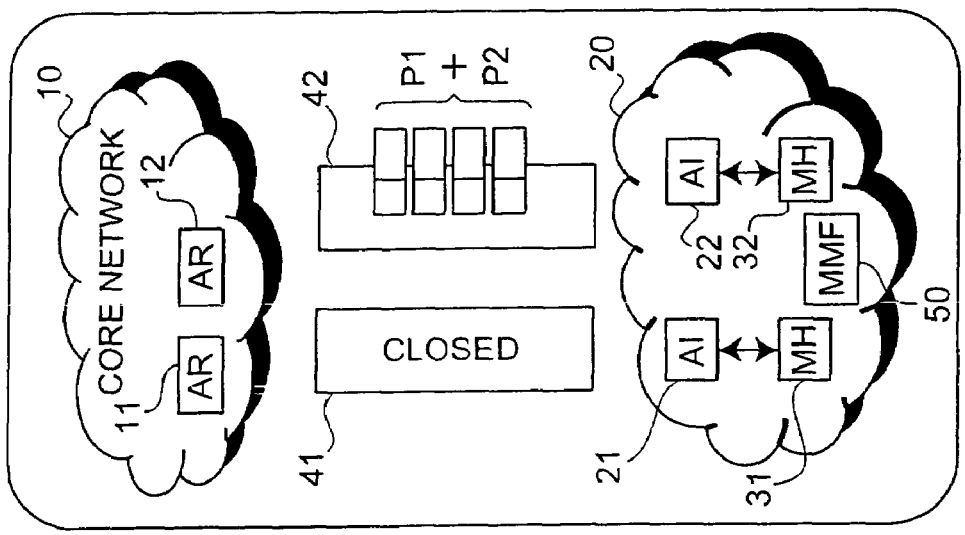
FIG. 3B is a state diagram of the state at the start of a handover which serves to illustrate the logic of a seamless handover using multihoming, of the multihoming moving network.
Figure 3C:
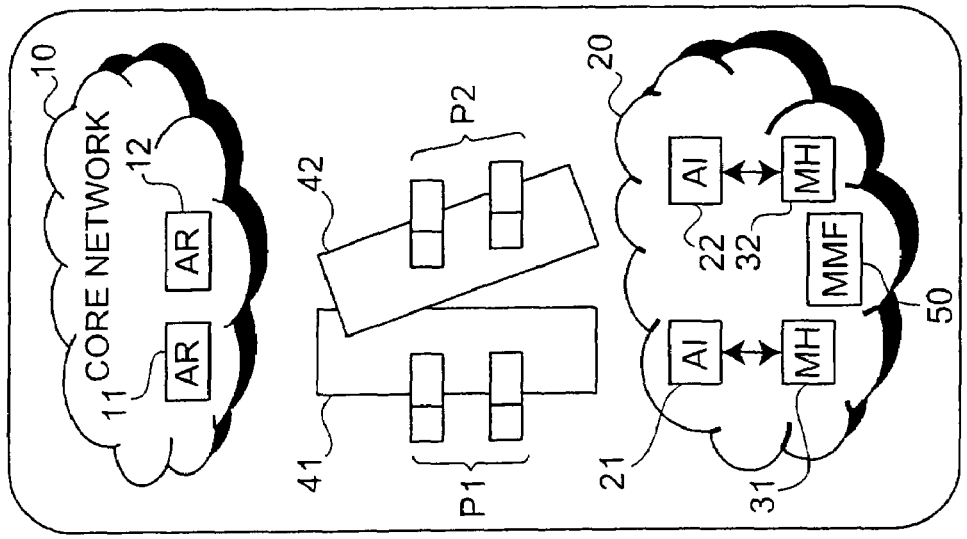
FIG. 3C is a state diagram after handover completion which serves to illustrate the logic of a seamless handover using multihoming, of the multihoming moving network.

FIGS. 3A-3C show the logic for a handover using multihoming, of the MN 20 has the multihoming function. As shown in FIG. 3A, prior to the handover, the two AI 21, 22 are connected to the same AR 11, and data packets are transmitted and received between the MN 20 and the core network 10 via the lines 41, 42 of the AI 21, 22 respectively. At the start of the handover, the NAI 22, which is frontward in the direction of movement, transitionally enters a mode in which same is connected to the new AR 12, as shown in FIG. 3B. At such time, the line 41 on the side of the OAI 21 is disconnected in keeping with movement. However, this can be assumed according to the function (velocity tracking function of the MN 20) of the MMF 50 that will be described subsequently. For this reason, the MMF 50 implements close processing (that is, processing to disable the transmission and receipt of data although the line 41 is not disconnected) so that all the transmission data P1 and P2 is transmitted by using the line 42 to which the NAI 22 is connected. Further, after the handover has ended, the line 41 on the side of the OAI 21 can then be connected to the new AR 12 as shown in FIG. 3C, and hence a data transfer using two lines as per the initial state in FIG. 3A is feasible.

Switching processing is thus switched locally without propagation to the entire network or informing the origin of the transmission as per an ordinary handover procedure. Hence, packet loss and a handover latency caused by a disconnection of the line on the side of the OAI and by performing non-local switching processing can be avoided, whereby a seamless handover can be implemented.

Specific embodiments according to the handover control method of the MN 20 equipped with multihoming function will be described hereinbelow. Here, a mode in which the MH is not aware of switching (FIGS. 4A, 4B, and 5) and a mode in which the MH is aware of switching (FIGS. 6A, 6B, and 7) will be described in this order.

Figure 4B:
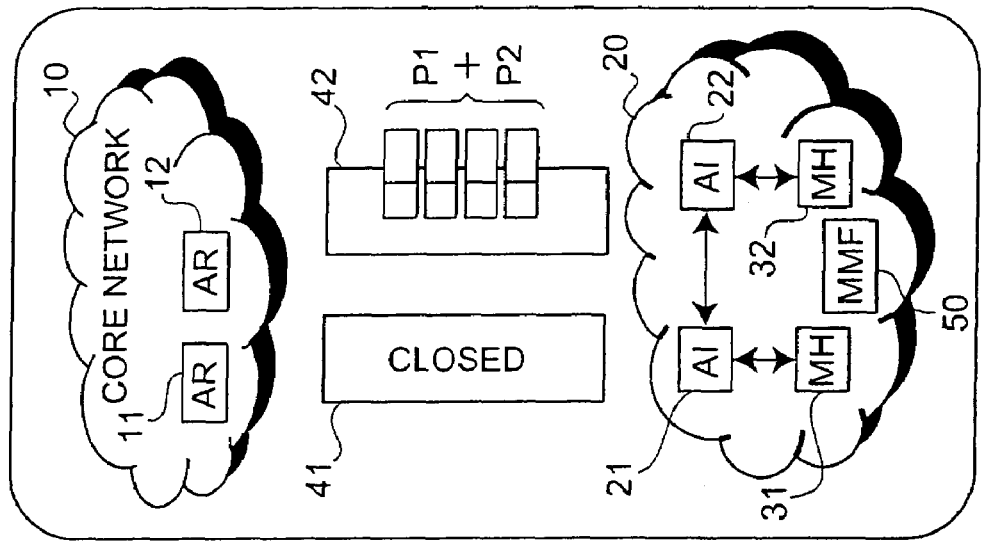
FIG. 4B shows the state after the MMF issues a switching instruction in the mode in which the MH is not aware of switching.
Figure 4A:
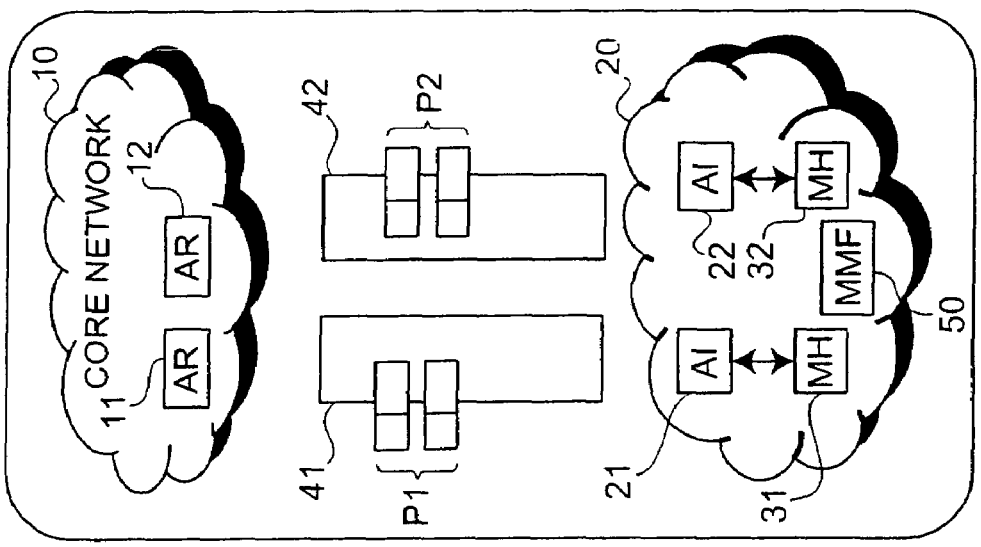
FIG. 4A shows the state before the MMF issues a switching instruction in the mode in which the MH is not aware of switching.
Figure 5:
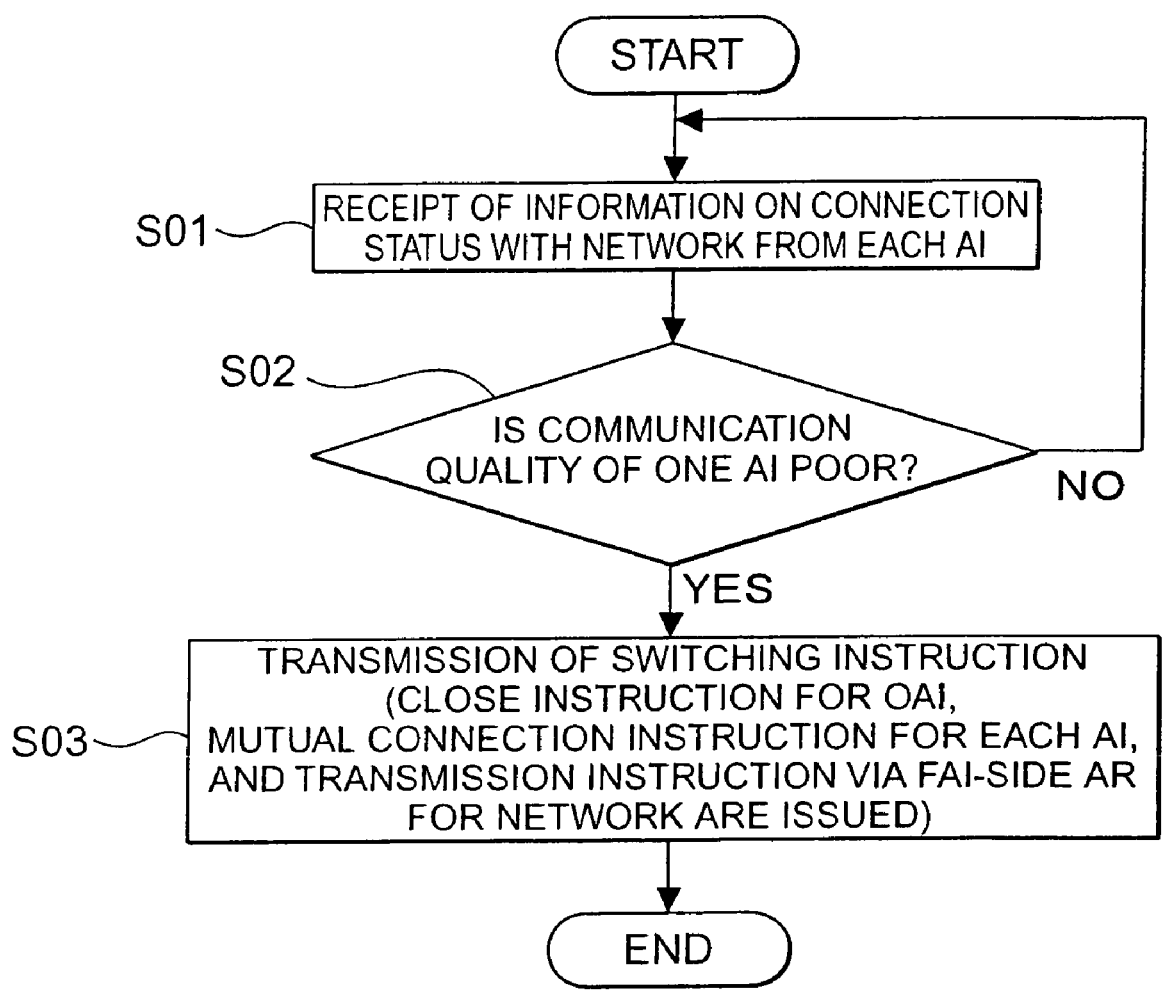
FIG. 5 is a flowchart showing the MMF control operation of the example in FIGS. 4A and 4B.

FIGS. 4A and 4B are state transition diagrams for the mode in which the MH is not aware of switching, and FIG. 5 is a flowchart showing the MMF control operation for the example of FIGS. 4A and 4B. Until the MMF 50 shown in FIG. 4A issues a switching instruction, each AI 21, 22 reports the connection status to the core network 10, to the MMF 50 at fixed intervals. As shown in FIG. 5, the MMF 50 receives information on the connection status between each AI and the core network 10 from each AI (S01), and, on the basis of this connection status information, judges whether the line quality of one AI is poor or not in light of a predetermined condition (S02). The predetermined condition may be that the field strength between the AI and core network 10 should be less than a predetermined threshold value, and may be that a predicted value for the field strength between the AI and the core network 10 that is predicted on the basis of subsequent movement prediction should be less than a predetermined threshold value.

If it is judged in S02 that the line quality of every AI is not poor, processing returns to S01 and is repeated. If it is judged in S02 that the line quality of one AI is poor, a switching instruction is transmitted to the AI 21, 22 and the core network 10 (S03). More specifically, each of the AI 21, 22 is issued with an instruction for a mutual connection therebetween, and, more particularly, the OAI 21 receives an instruction to enter a closed state, and the core network 10 receives an instruction to transmit data via the AR 12 on the side of the FAI 22.

As shown in FIG. 4B, after the above-mentioned switching instructions have been transmitted, the OAI 21, which has thus received the switching instruction, causes the line 41 to enter a closed state so that data is not transmitted or received, without disconnecting the connection on the line 41 to the core network 10, and establishes a connection to the NAI 22. Further, also in the case of the core network 10, which has thus received a switching instruction, the AR 11 connected to the OAI 21 causes the line 41 to enter a closed state so that data is not transmitted or received, while still maintaining the connection on the line 41 to the OAI 21.

Therefore, a portion of the data transmitted from the MN 20 to the core network 10 can be transmitted to the core network 10 via the side of the NAI 22 access line 42 by passing via the connecting link between the OAI 21 and the NAI 22, without the MH 31, 32 in the MN 20 being aware of this operation. That is, as shown in FIG. 4B, the transmission data P1 transmitted by the MH 31 to the core network 10 is transmitted to the core network 10 via the side of the NAI 22 access line 42 together with the transmission data P2 transmitted by the MH 32 to the core network 10.

Figure 6A:
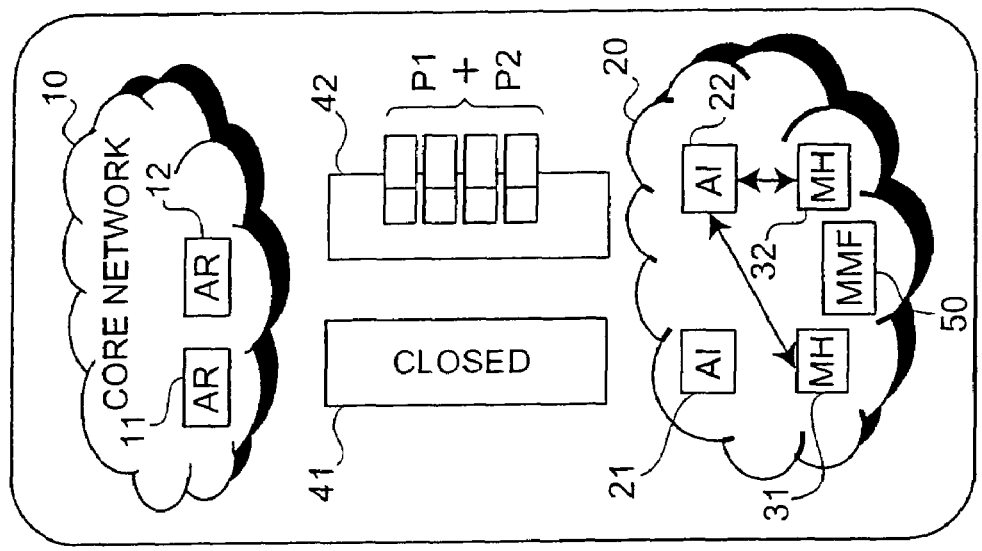
FIG. 6A shows the state before the MMF issues a switching instruction in the mode in which the MH is aware of switching.
Figure 6B:
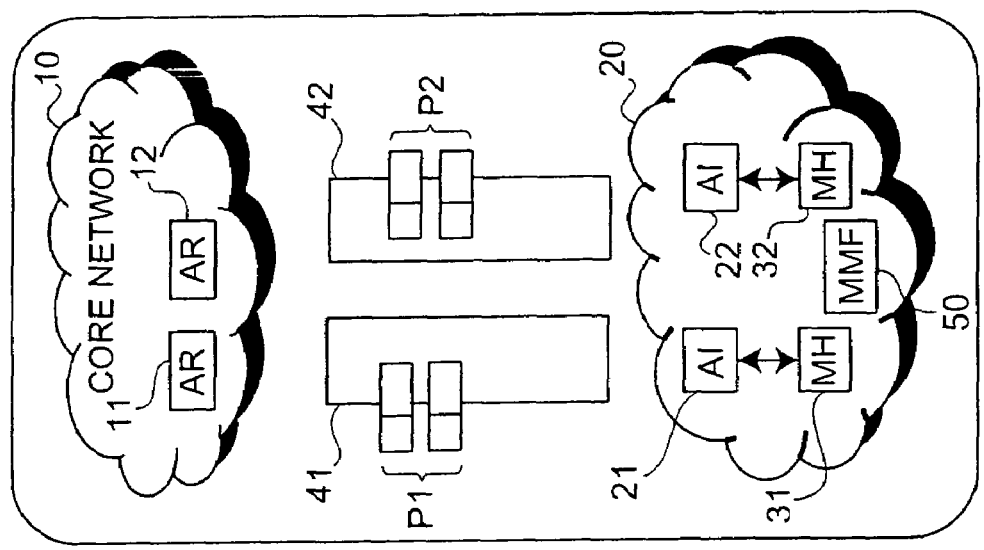
FIG. 6B shows the state after the MMF issues a switching instruction in the mode in which the MH is aware of switching.
Figure 7:
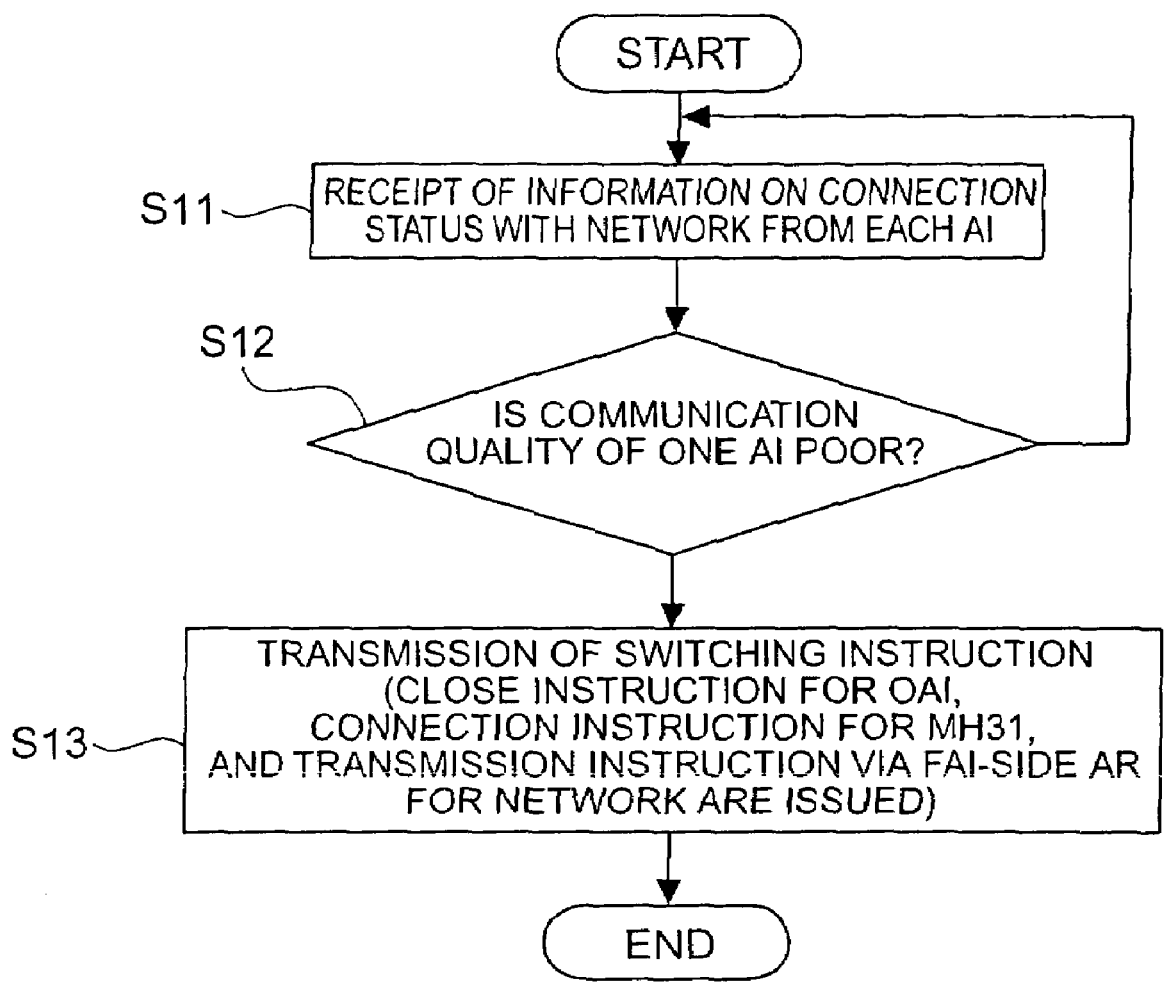
FIG. 7 is a flowchart showing the MMF control operation of the example in FIGS. 6A and 6B.

Next, the mode in which the MH is aware of switching will be described. FIGS. 6A and 6B are the state transition diagrams of the mode in which the MH is aware of switching, and FIG. 7 is a flowchart showing the MMF control operation of the example in FIGS. 6A and 6B. Until the MMF 50 shown in FIG. 6A issues a switching instruction, each AI 21, 22 reports the connection status to the core network 10, to the MMF 50 periodically. As shown in FIG. 7, the MMF 50 receives information on the connection status between each AI and the core network 10 from each AI (S11), and, on the basis of this connection status information, it is judged whether the line quality of one AI is poor or not in light of predetermined conditions (S12). Similarly to the above-described mode in which the MH is not aware of switching, the predetermined condition may be that the field strength between the AI and core network 10 should be less than a predetermined threshold value, and may be that a predicted value for the field strength between the AI and the core network 10 that is predicted on the basis of subsequent movement prediction should be less than a predetermined threshold value.

If it is judged in S12 that the line quality of every AI is not poor, processing returns to S11 and is repeated. If it is judged in S12 that the line quality of one AI is poor, a switching instruction is transmitted to the OAI 21, the core network 10, and the MH 31 on the side of the OAI 21 (S13). More specifically, the OAI 21 is issued with an instruction to enter a closed state, the core network 10 receives an instruction to transmit data via the AR 12 on the side of the FAI 22, and the MH 31 receives an instruction to connect to the NAI 22 instead of the OAI 21.

As shown in FIG. 6B, after the above-mentioned switching instructions have been transmitted, the OAI 21, which has thus received the switching instruction, causes the line 41 to enter a closed state so that data is not transmitted or received, without disconnecting the connection on the line 41 to the core network 10. Further, also in the case of the core network 10, which has thus received a switching instruction, the AR 11 connected to the OAI 21 causes the line 41 to enter a closed state so that data is not transmitted or received, while still maintaining the connection on the line 41 to the OAI 21. In addition, the MH 31 establishes a connection to the NAI 22 instead of the OAI 21.

Therefore, with the side of the OAI 21 MH 31 in the MN 20 being aware of switching, the transmission data P1 transmitted by the MH 31 to the core network 10, can be transmitted to the core network 10 via the side of the NAI 22 access line 42 by way of the connecting link between the MH 31 and the NAI 22, as per FIG. 6B.

In either the switching mode in which the MH is not aware of switching or the switching mode in which the MH is aware of switching, as described above, switching is performed locally without propagation to the entire network or informing the origin of the transmission, as is the case for an ordinary handover procedure. Hence, packet loss and a handover latency caused by a disconnection of the line on the side of the OAI and by performing non-local switching processing can be avoided, whereby a seamless handover can be implemented.

Further, although an example in which, in the MN 20, the AI used to establish the connection to the core network 10 is switched from the OAI 21 to the NAI 22, was described above, when the MMF 50 selects one switching-destination AI in a situation where three or more AI are present, an AI corresponding with the maximum-value field strength may be selected from among the field strengths between each AI and the core network 10, for example. Furthermore, an AI that corresponds with the predicted value for the maximum-value field strength may be selected from among predicted values for the field strengths between each AI and the core network 10 which are predicted on the basis of subsequent movement prediction.

Second Embodiment

Figure 8:
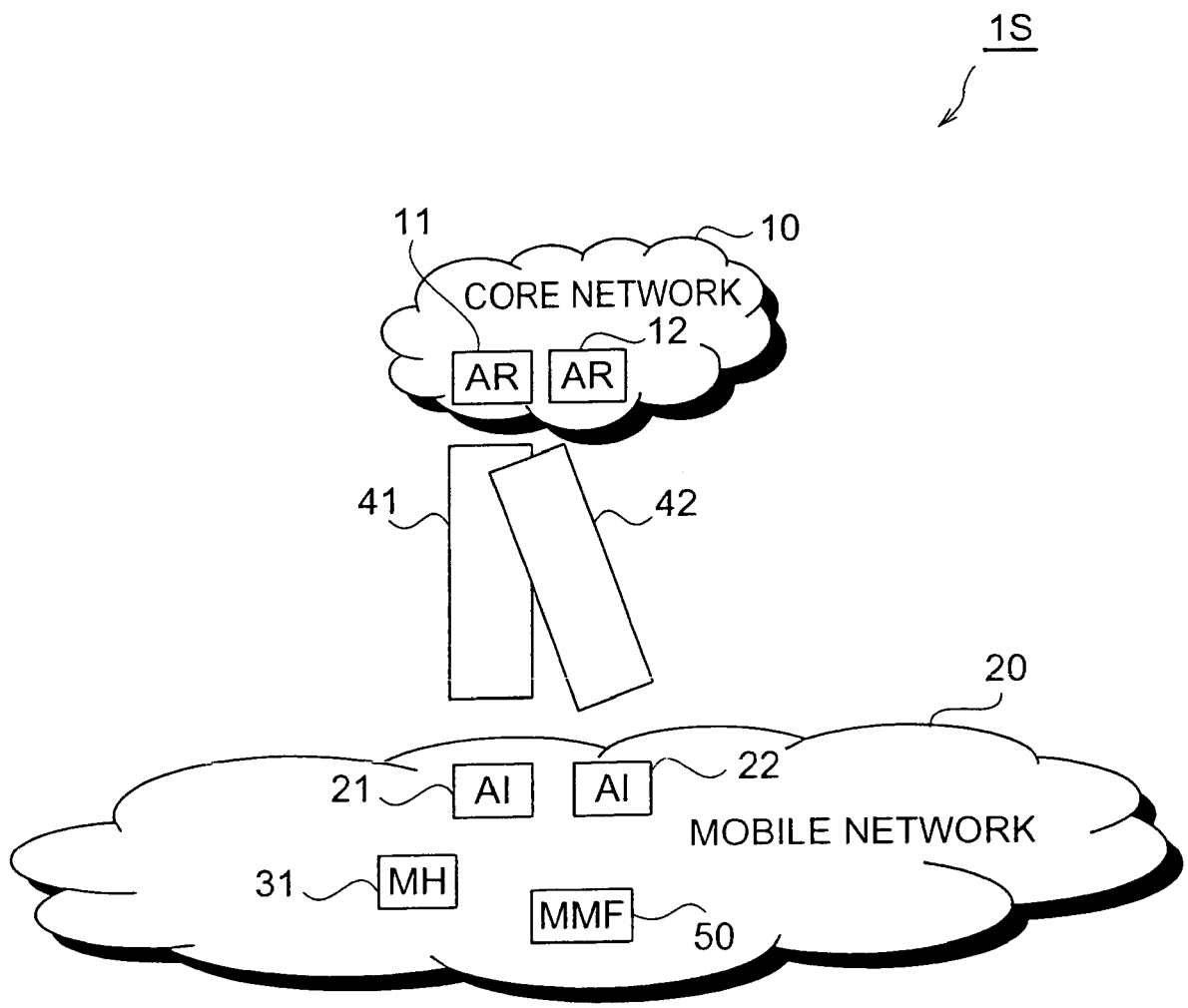
FIG. 8 shows the initial state of the mobile communication system of the second embodiment.

FIG. 8 is a constitutional view of the initial state of a mobile communication system 1S of the second embodiment. As shown in this figure, a mobile communication system 1S is constituted by the core network 10, which is constituted comprising a plurality of AR 11, 12; and the MN 20, which is constituted comprising a plurality of AI 21, 22, the MH 31, and a control device (MMF) 50 that is provided with a function for governing mobile management and switching instructions (MMF: Mobility Management Function). The MH 31 is connected to either AR on the side of the core network 10 via either line 41 of the AI 21 or line 42 of the AI 22, and thus transmits and receives data.

Further, the MN 20 moves from left to right in FIG. 8. Of the two AI 21, 22, the AI 22 that lies foremost in the direction of movement is called an NAI (New Access Interface), and the AI 21 that lies rearward in the direction of movement is called an OAI (Old Access Interface). The MN 20 is therefore a moving network in which the two AI 21, 22 are multihomed.

Figure 9:
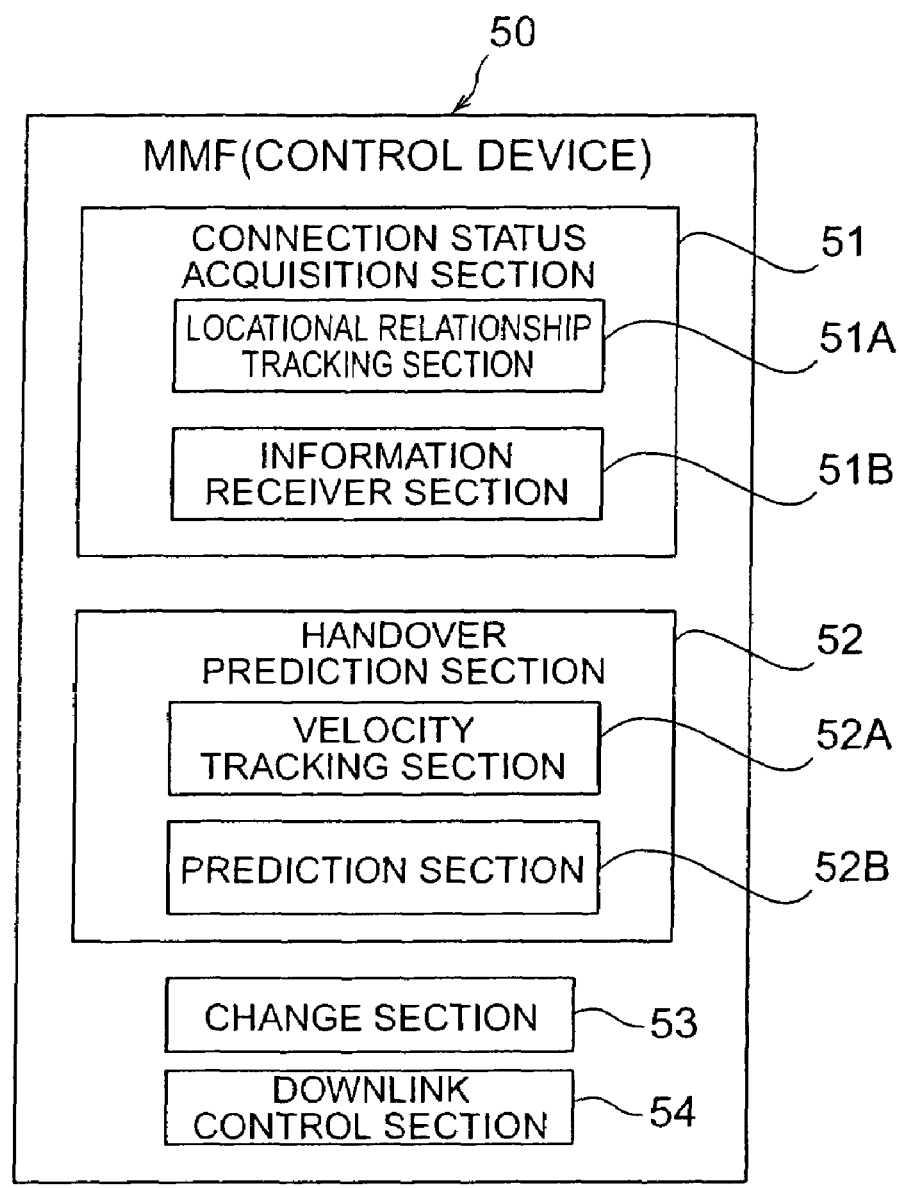
FIG. 9 is a function block constitutional view of the MMF of the second embodiment.

FIG. 9 is a function block constitutional view of the MMF 50 of the second embodiment. As shown in this figure, the fact that the MMF 50 is constituted comprising the connection status acquisition section 51, the handover prediction section 52, the change section 53, and the downlink control unit 54, is the same as for the MMF 50 of the first embodiment (FIG. 2). However, the connection status acquisition section 51 is constituted comprising a locational relationship tracking section 51A that tracks the locational relationship of all the AI, an information receiver section 51B that receives information on the connection status of each AI to the core network 10, and switching information that includes identification information for identifying the switching origin AR when switching occurs and the switching destination AR, as well as switching end time information, the information being reported by each AI. The handover prediction section 52 is constituted comprising a velocity tracking section 52A for tracking at least velocity information pertaining to the MN 20 in accordance with a tracking logic (described later), on the basis of the locational relationship of each AI thus tracked and the connection status information and switching information thus received, and a prediction section 52B for predicting subsequent movement and changes in the field strength from the tracked information. The velocity tracking section 52A pre-stores information on the distance x between the two AI 21, 22, and, upon recognizing, on the basis of the switching information from each AI, that adjacent switching is with respect to the same AR, the velocity tracking section 52A tracks, given a switching time difference t for the adjacent switching and a distance x between the two AI, a value obtained by dividing the distance x by the switching time difference t as the velocity pertaining to the MN 20.

Velocity tracking processing, which is based on switching information from a single AI combination (that is, the two AI 21, 22) executed by the MMF 50, will be described hereinbelow on the basis of the flowchart of FIG. 10 and the state diagrams of FIGS. 8, 11, and 12. At the start of processing, the mobile communication system is in the initial state of FIG. 8, and the AI 21, 22 report the connection status to the core network 10, to the MMF 50 periodically.

Figure 10:
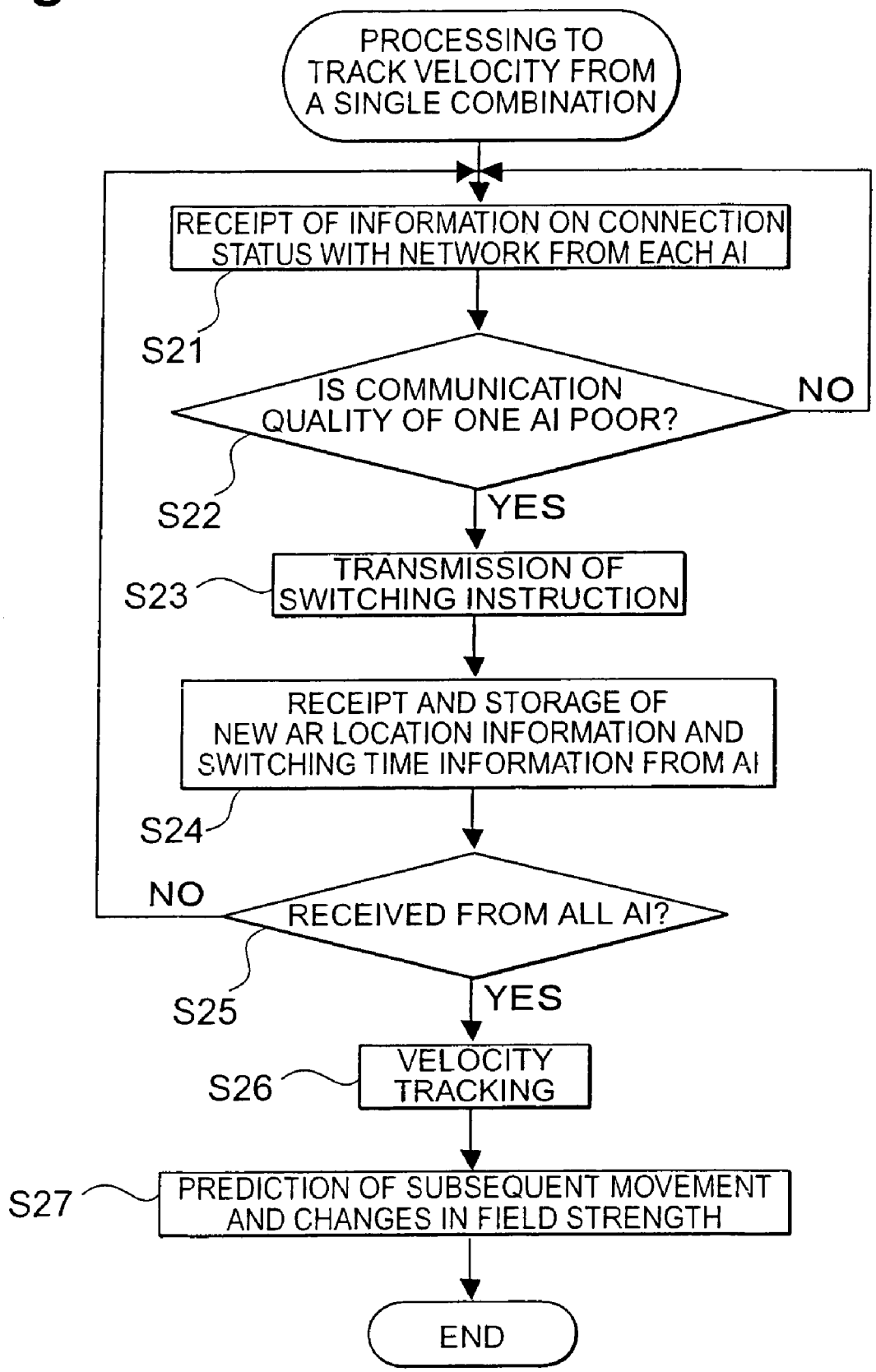
FIG. 10 is a flowchart showing the velocity tracking processing on the basis of information based on a single AI combination.

As shown in FIG. 10, the MMF 50 receives information on the connection status between each AI and the core network 10 from each AI (S21), and, on the basis of this connection status information, judges whether the line quality of one AI is poor or not in light of predetermined conditions (S22). Just like the first embodiment, the predetermined conditions may be that the field strength between the AI and core network 10 should be less than a predetermined threshold value, and may be that a predicted value for the field strength between the AI and the core network 10 predicted on the basis of subsequent movement prediction, should be less than a predetermined threshold value.

If it is judged in S22 that the line quality of every AI is not poor, processing returns to S21 and is repeated. If it is judged in S22 that the line quality of one AI is poor, a switching instruction is transmitted to the AI 21 and the core network 10 (S23). Here, in the initial state of FIG. 8 (a state where each AI is connected to the same AR 11), because the MN 20 moves to the right in FIG. 8, first the quality of the line 42 of the NAI 22 deteriorates and the quality of the line 42 is judged to be poor in S22. For this reason, the MMF 50 transmits a switching instruction for the NAI 22 and core network 10 to switch the connection destination of the NAI 22 from the current AR 11 to the new AR.

Figure 11:
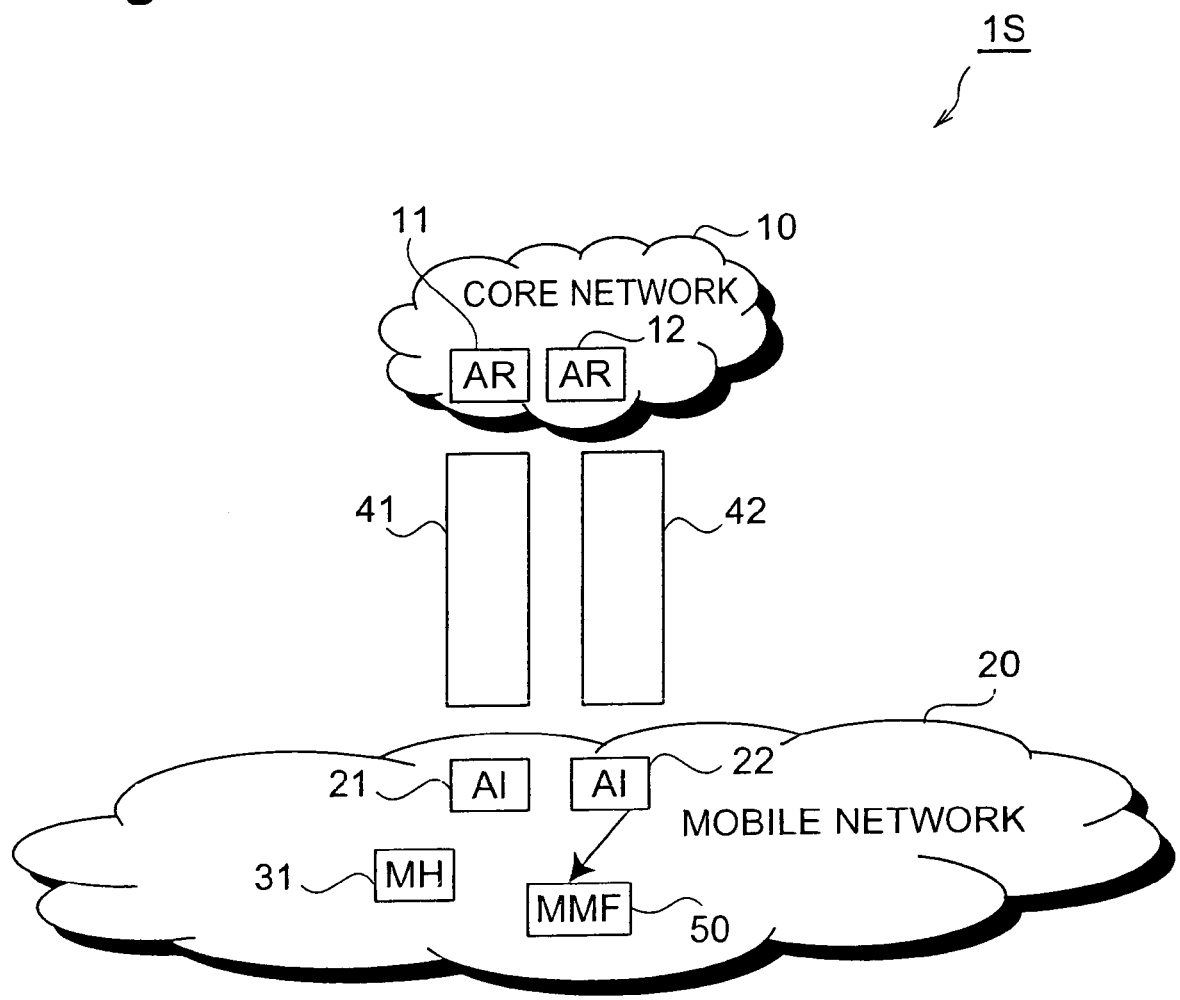
FIG. 11 shows the state immediately after the NAI is switched to the new AR.

As shown in FIG. 11, the NAI 22 and core network 10, which have thus received the switching instruction, switch the connection destination of the NAI 22 to the new AR 12, and hence the AR 12 and NAI 22 are connected by the line 42. Further, location information on the new AR 12 and information about the time (switching time) t1 when switching to the AR 12 has completed, are transmitted to the MMF 50.

The MMF 50 receives the location information on the new AR 12 and the information about the switching time t1 from the NAI 22, and cumulatively stores them (S24). Because, at this time, only one AI 22 is switched, S25 yields a negative judgment, and processing returns to S21, whereupon the processing of step S21 and subsequent steps are executed once again.

Further, in the state of FIG. 11, because the MN 20 moves again to the right in FIG. 8, the quality of the line 41 of the OAI 21 then deteriorates and it is thus judged in S22 that the quality of the line 41 is poor. For this reason, the MMF 50 transmits a switching instruction for the OAI 21 and the core network 10 to switch the connection destination of the OAI 21 from the current AR 11 to the new AR.

Figure 12:
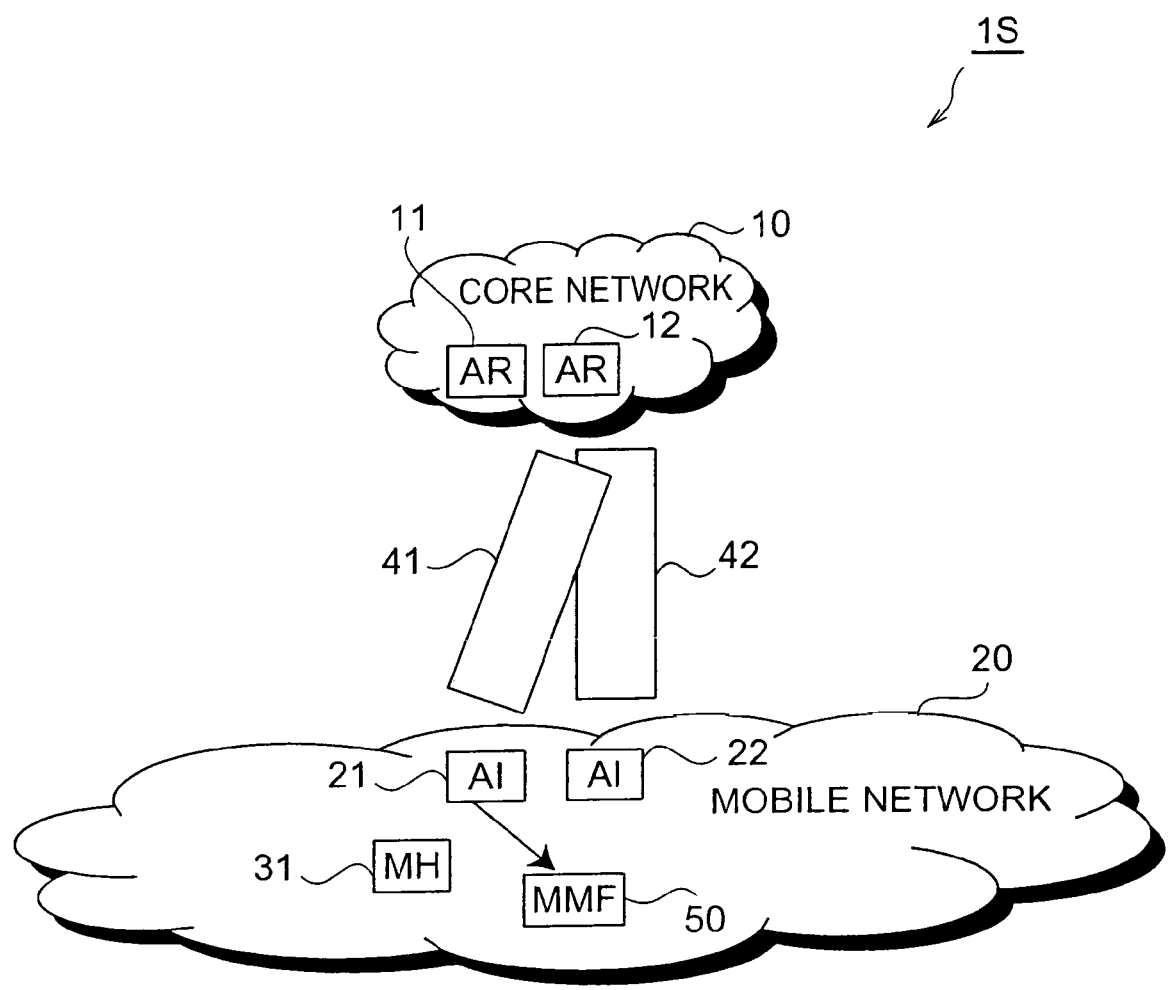
FIG. 12 shows the state immediately after the OAI is switched to the new AR.

As shown in FIG. 12, the OAI 21 and core network 10, which have thus received the switching instruction, switch the connection destination of the OAI 21 to the new AR 12, and hence the AR 12 and OAI 21 are connected by the line 41. Further, location information on the new AR 12 and information about the time (switching time) t2 when switching to the AR 12 has completed, is transmitted to the MMF 50.

The MMF 50 receives the location information on the new AR 12 and the information about the switching time t2 from the OAI 21, and cumulatively stores them (S24). Because, at this time, the location information on the new AR and the information about the switching time have been received from both of the two AI, S25 yields an affirmative judgment, and processing proceeds to S26.

In S26, the velocity tracking section 52A recognizes that the switching between the two AI 22, 21 is the switching between the same AR, by the fact that the location information on the new AR 12 of the NAI 22 corresponds to the location information on the new AR 12 of the OAI 21. In addition, the velocity tracking section 52A obtains a value by dividing the pre-prepared distance x between the AI 21, 22 by the switching time difference t (where t is equivalent to (t2-t1)) for the two switching events, and tracks the value as the velocity pertaining to the MN 20. Further, at such time, the velocity tracking section 52A is able to track the direction of movement in which the NAI 22 locates forward side and the OAI 21 locates backward side, as the direction of movement of the MN 20. In addition, in S27, the prediction section 52B is able to predict the subsequent movement of the MN 20 and change in the field strength on the basis of the velocity and the direction of movement of the MN 20.

Further, although MN velocity tracking was described in the above description on the basis of the switching information from one combination of AIs (that is, the two AI 21, 22), the velocity and the direction of movement of the MN can be tracked as detailed below, on the basis of switching information from plural combinations of AIs (that is, three or more AI), by applying the above-described technology to practical use.

Figure 13:
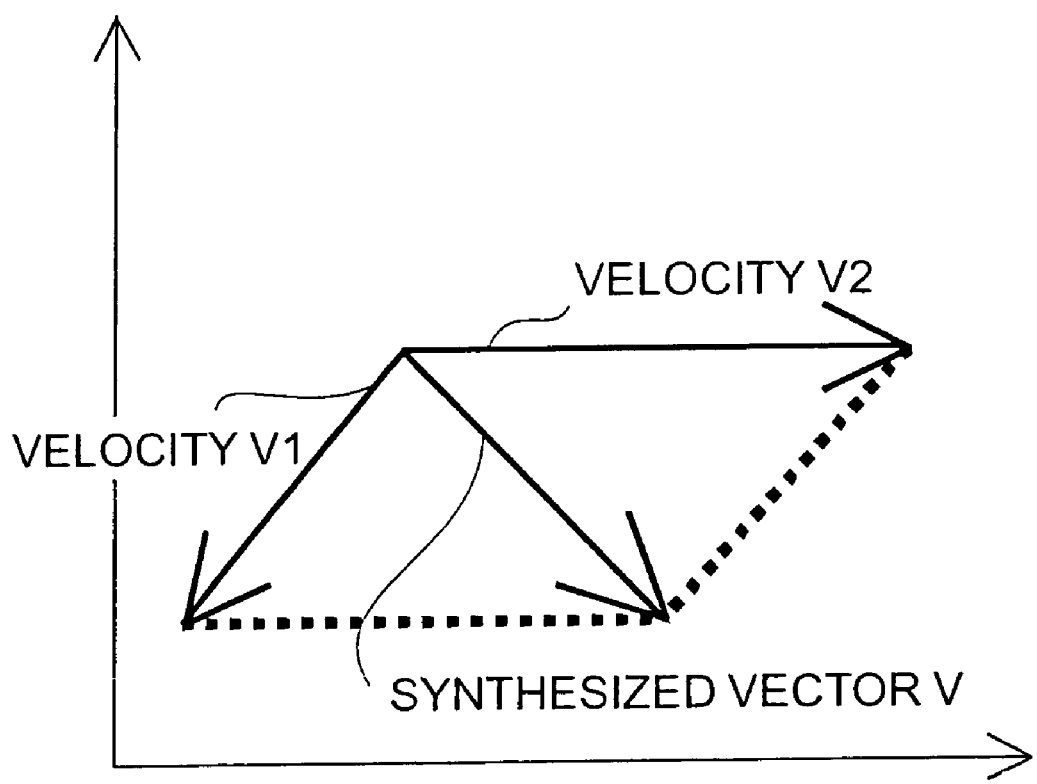
FIG. 13 is a diagram which serves to illustrate the processing in which a vector sum is calculated.
Figure 14:
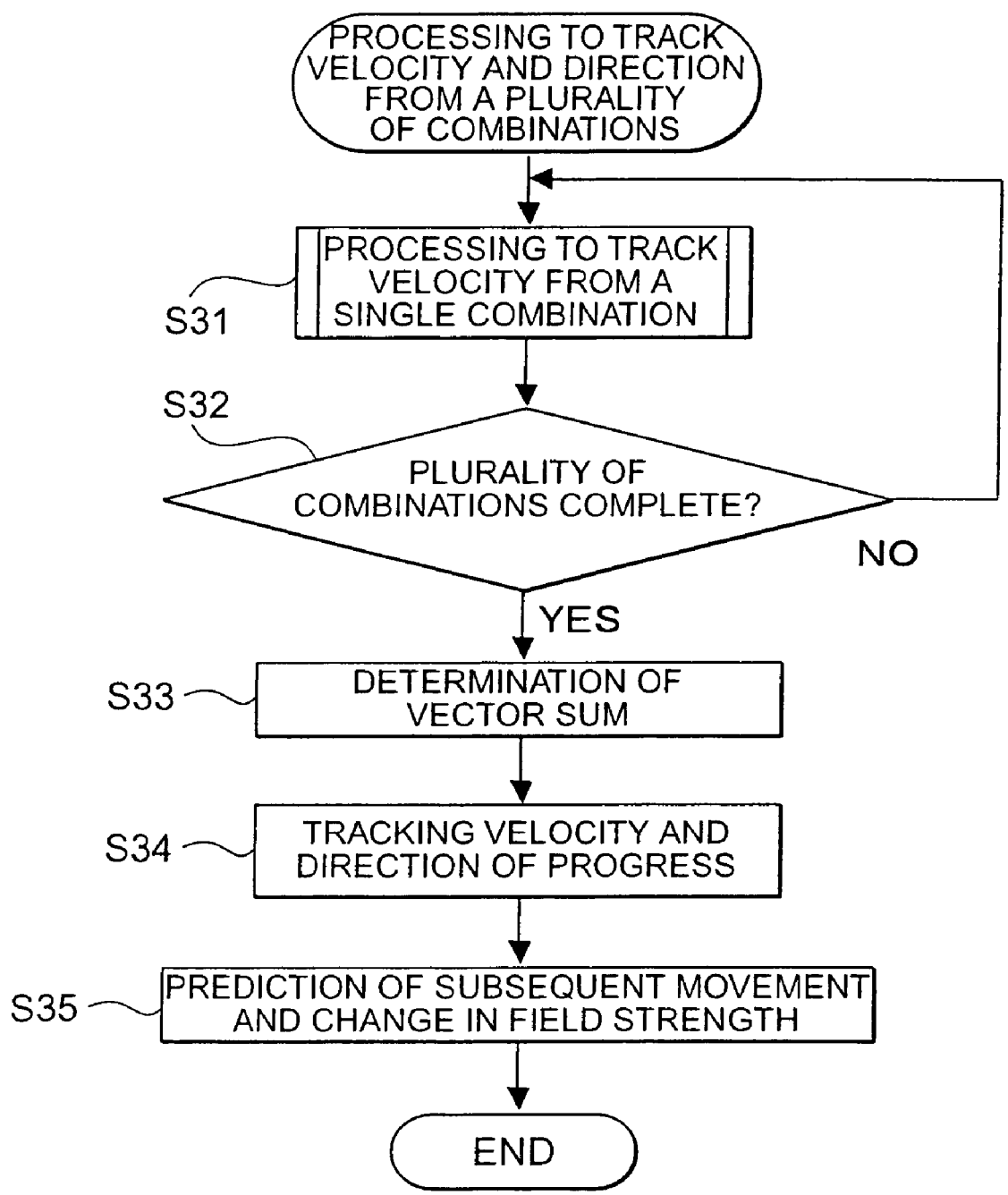
FIG. 14 is a flowchart showing the velocity and the direction of movement tracking processing on the basis of information based on a plurality of AI combinations.

That is, the processing of FIG. 14 is executed by the MMF 50. In S31 and S32, the velocity tracking section 52A executes the above-described velocity tracking processing in FIG. 10, for each of a plurality of combinations of the AIs. For example, two velocity vectors v1, v2 are obtained as shown in FIG. 13 on the basis of the switching information from two combinations of AIs. Here, the direction of each velocity vector is equivalent to the tracked direction of movement, and the size of each velocity vector is equivalent to a value for the tracked velocity.

Further, the velocity tracking section 52A calculates a vector sum in S33, and, in S34, tracks the direction of movement and the velocity of the MN on the basis of the vector obtained. In the example in FIG. 13, a synthesized vector V is obtained by calculating the vector sum of the two velocity vectors v1, v2, and the direction of movement of the MN can be tracked on the basis of the direction of the synthesized vector V, and the velocity of the MN can be tracked on the basis of the size of this synthesized vector V. In addition, in S35, the prediction section 52B is able to predict the subsequent movement and change in the field strength of the MN 20 on the basis of the velocity and direction of movement of the tracked MN 20.

As described above, the velocity and direction of movement of the MN 20 can also be tracked on the basis of either the switching information from one combination of AIs (two AIs) or switching information from a plurality of combinations of AIs (three or more AIs), and the subsequent movement and change in the field strength is predicted on the basis of the tracked information. For this reason, handover prediction information of favorable accuracy can be obtained, and it is possible to implement a seamless handover more reliably.

Further, although a case where the present invention was applied to an MN (moving network) was described in each of the above-described embodiments, the same effects can be obtained by performing a similar operation also in a case where the present invention is applied to an MH (mobile host).

As described hereinabove, according to the present invention, in the case of a mobile host and network that are multi-homed by means of a plurality of access interfaces, attention is drawn to a characteristic in which the communication quality of the line connected to each access interface varies according to movement, and once information on the connection status of each access interface to the core network has been acquired or a subsequent handover predicted, the access interface adopted as the connection interface is dynamically changed on the basis of this connection status information or subsequent handover prediction information. Thus, conventionally, when a handover latency is generated without the variation in the communication quality of the line connected to each access interface being predicted, packet loss can be avoided and a seamless handover can be implemented, by minimizing the handover latency by means of the dynamic change to the access interface on the basis of the connection status information or handover prediction information.

What is claimed is:

1. A control device, which constitutes a moving network including a plurality of mobile hosts, and a plurality of mutually connectable access interfaces each constituting a connection interface for a connection to a core network from a mobile host, and which serves to control a handover relating to the connection to the core network at the access interfaces, comprising:

connection status acquiring means for acquiring information on a connection status to the core network at each access interface, from each access interface;

handover predicting means for predicting a subsequent handover on a basis of the information on the connection status to the core network at each access interface; and changing means for dynamically changing a first access interface adopted as the connection interface for the mobile host to a second access interface in accordance with predetermined logic when a predetermined condition is satisfied on a basis of the information on the connection status to the core network at each access interface or prediction information for a subsequent handover, wherein, upon dynamically changing the first access interface to the second access interface, the mobile host remains connected to the first access interface that is not capable of maintaining a predetermined communication quality and is connected to the second access interface which is capable of maintaining the predetermined communication quality, the changing means issues an instruction for establishing a mutual communication connection between the first access interface and the second access interface, and the changing means continues to transmit and receive data to and from the first access interface through the second access interface via a communication link created in response to the instruction for establishing the mutual communication connection.

2. The control device according to claim 1, further comprising:
   downlink control means that performs control so that downlink data from the core network is transmitted via an access router that is connected to the second access interface, among the access routers in the core network.

3. The control device according to claim 1, wherein the connection status acquiring means further comprises:
   locational relationship tracking means for tracking the locational relationship of all the access interfaces connected to the plurality of mobile hosts and the moving network; and
   information receiving means for receiving information on the connection status between each access interface and the core network, and switching information that includes identification information for identifying a previous access router and a destination access router at a time switching occurs, as well as switching end time information; and
   wherein the handover predicting means further comprises:
   velocity tracking means for tracking at least velocity information pertaining to the plurality of mobile hosts and the moving network in accordance with a predetermined tracking logic, on a basis of the locational relationship of each access interface thus tracked and the connection status information and switching information thus received; and
   predicting means for predicting subsequent movement and changes in a field strength based on the at least velocity information tracked by the velocity tracking means.

4. The control device according to claim 3, wherein, for the mobile host and the moving network that are multihomed by use of two access interfaces, upon recognizing, on a basis of the switching information from each access interface, that adjacent switchings are executed by a same access router, the control device tracks a value obtained by dividing a distance x by a switching time difference t, as a velocity pertaining to the mobile host and moving network.

5. The control device according to claim 3, wherein, for the mobile host and the moving network that are multihomed by means of three or more access interfaces, upon recognizing, on a basis of the switching information from each access interface, that adjacent switchings are executed by a same access router, the control device tracks, based on a plurality of combinations of a switching time difference t and a distance x between access interfaces for the adjacent switchings, a direction which links the three or more access interfaces and where a first-switched access interface lies foremost as a direction of movement, and a value obtained by dividing the distance x by the switching time difference t as the velocity, with respect to each combination; and
   the control device finds a vector sum of velocity vectors for each combination and tracks a direction of movement and velocity of the mobile host and moving network by means of the vector sum thus obtained.

6. The control device according to claim 1, wherein the predetermined condition is that a field strength between the first access interface and the core network should be less than a predetermined threshold value.

7. The control device according to claim 1, wherein the predetermined condition is that a predicted value for a field strength between the access interface and the core network which is predicted on a basis of subsequent movement prediction should be less than a predetermined threshold value.

8. The control device according to claim 1, wherein the predetermined logic is that of selecting the second access interface that corresponds with a maximum-value field strength from among field strengths between each access interface and the core network.

9. The control device according to claim 1, wherein the predetermined logic is that of selecting the second access interface that corresponds with a predicted value for a maximum-value field strength from among predicted values for field strengths between each access interface and the core network, which are predicted on a basis of subsequent movement prediction.

10. A handover control method by a mobile communication system that includes a moving network comprising a plurality of mobile hosts, a plurality of mutually connectable access interfaces each constituting a connection interface for a connection to a core network from a mobile host, and a control device for controlling a handover relating to the connection to the core network at the access interfaces, the method comprising:
    acquiring, with an acquisition unit in the control device, information on a connection status to the core network at each access interface, from each access interface;
    predicting, with an handover prediction unit in the control device, a subsequent handover on a basis of the information on the connection status to the core network at each access interface;
    dynamically changing, with a change unit in the control device, a first access interface adopted as the connection interface for the mobile host to a second access interface device in accordance with predetermined logic when a predetermined condition is satisfied on a basis of the information on the connection status to the core network at each access interface or prediction information for a subsequent handover,
    wherein, upon dynamically changing the first access interface to the second access interface, the mobile host remains connected to the first access interface that is not capable of maintaining a predetermined communication quality and that is connected to the second access interface which is capable of maintaining the predetermined communication quality,
    the changing includes issuing an instruction for establishing a mutual communication connection between the first access interface and the second access interface; and
    controlling the control device to continue to transmit and receive data to and from the first access interface through the second access interface via a communication link created in response to the instruction for establishing the communication connection.

11. A communication system, comprising:
    a moving network including a plurality of mobile hosts, and a plurality of mutually connectable access interfaces each constituting a connection interface to a core network from a mobile host; and
    a control device configured to control a handover relating to the connection to the core network at the access interfaces, said control device including
       connection status acquiring means for acquiring information on a connection status to the core network at each access interface, from each access interface,
       handover predicting means for predicting a subsequent handover on a basis of the information on the connection status to the core network at each access interface, and
       changing means for dynamically changing a first access interface adopted as the connection interface for the mobile host to a second access interface in accordance with predetermined logic when a predetermined condition is satisfied on a basis of the information on the connection status to the core network at each access interface or prediction information for a subsequent handover, wherein, upon dynamically changing the first access interface to the second access interface, the mobile host remains connected to the first access interface that is not capable of maintaining a predetermined communication quality and that is connected to the second access interface which is capable of maintaining the predetermined communication quality, the changing means issues an instruction for establishing a mutual communication connection between the first access interface and the second access interface, and the changing means continues to transmit and receive data to and from the first access interface through the second access interface via a communication link created in response to the instruction for establishing the mutual communication connection.

12. A control device, which constitutes a moving network including a plurality of mobile hosts, and a plurality of mutually connectable access interfaces each constituting a connection interface for a connection to a core network from a mobile host, and which serves to control a handover relating to the connection to the core network at the access interfaces, comprising:

a connection status acquiring unit configured to acquire information on a connection status to the core network at each access interface, from each access interface;

a handover predicting unit configured to predict a subsequent handover on a basis of the information on the connection status to the core network at each access interface; and a changing unit configured to dynamically change a first access interface adopted as the connection interface for the mobile host to a second access interface in accordance with predetermined logic when a predetermined condition is satisfied on a basis of the information on the connection status to the core network at each access interface or prediction information for a subsequent handover, wherein, upon dynamically changing the first access interface to the second access interface, the mobile host remains connected to the first access interface that is not capable of maintaining a predetermined communication quality and that is connected to the second access interface which is capable of maintaining the predetermined communication quality, the changing unit issues an instruction for establishing a mutual communication connection between the first access interface and the second access interface, and the changing unit is configured to continue to transmit and receive data to and from the first access interface through the second access interface via a communication link created in response to the instruction for establishing the mutual communication connection.

* * * * *